UNITED STATES PATENT OFFICE.

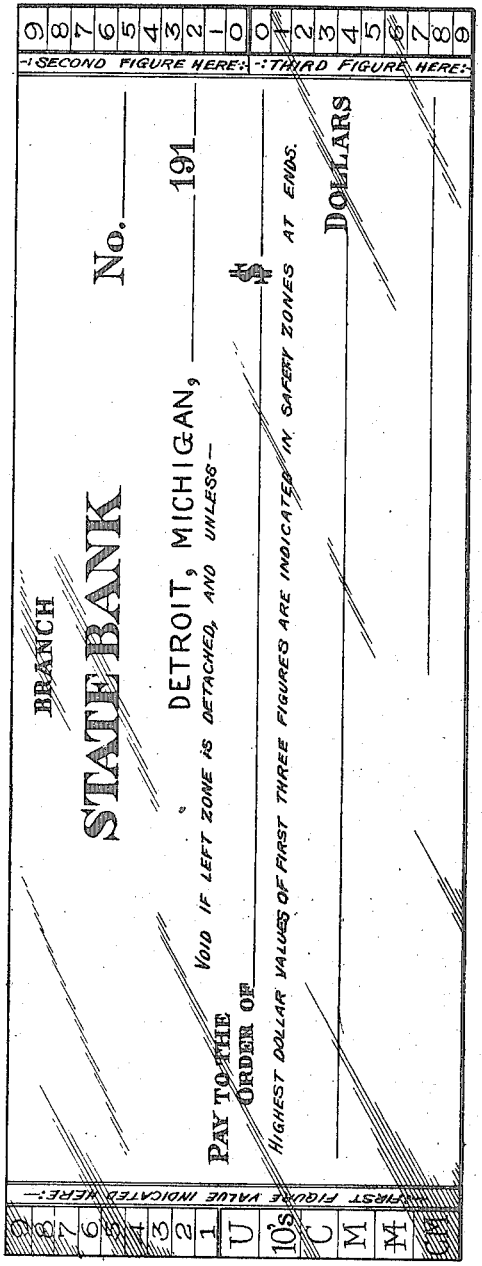

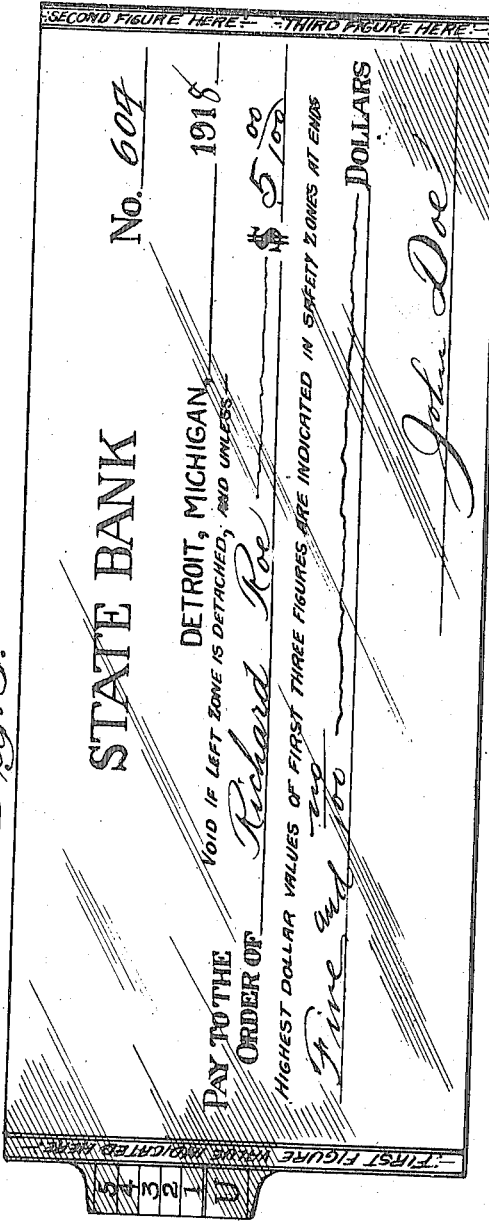
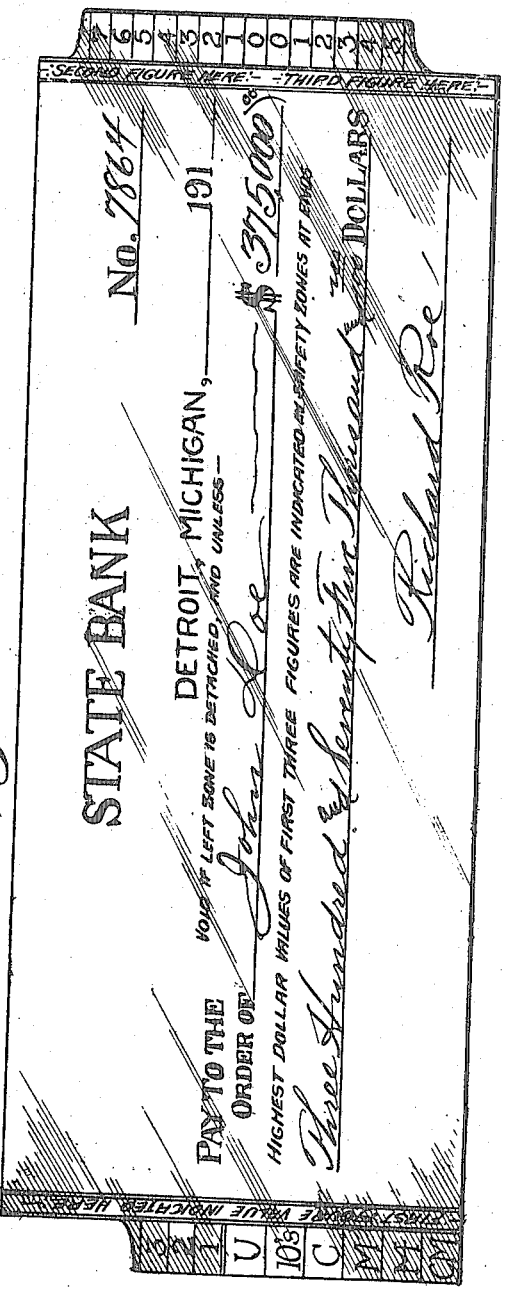

HENRY C. THATCHER, OF DETROIT, MICHIGAN.

BANK-CHECK AND THE LIKE.

1,184,895.

Specification of Letters Patent.  Patented May 30, 1916.

Application filed May 3, 1915. Serial No. 25,644.

*To all whom it may concern:*

Be it known that I, HENRY C. THATCHER, a citizen of the United States, residing at Detroit, in the county of Wayne and State of Michigan, have invented certain new and useful Improvements in Bank-Checks and the like, of which the following is a specification.

This invention relates to checks, drafts, money orders, etc. of the kind provided with means for preventing fraudulent raising or altering of the sum originally designated therein by the drawer or maker of the instrument, and the object of my invention is to provide an instrument of this class which is simple in construction, easily understood by the user, readily filled out or prepared, and which when so prepared cannot possibly be raised or altered to designate a sum above the amount for which the check is protected without detection.

My improvements are shown in the accompanying drawings, in which—

Figure 1 is a face view of a bank check embodying my invention in its preferred form. Fig. 2 is a similar view of a check drawn or made out for a definite sum and suitably protected to avoid alteration. Figs. 3 and 4 are similar views of checks made out for other specific amounts.

The check or other instrument may bear the usual inscriptions. The body or middle portion of the check shown in the drawings, in addition to containing inscriptions in the usual form, has printed thereon the words "Void if left zone is detached and unless highest dollar values of first three figures are indicated in safety zones at ends."

At each end of the check there is what I call a "safety zone," and as shown the zone A at the left-hand end of the check is divided into a column of fifteen spaces, the first nine spaces reading downward containing the numerals 1 to 9 arranged in reverse order; the remaining six spaces containing designations of units, tens, hundreds, thousands, tens of thousands and hundreds of thousands. Just inside of the column of spaces A are printed the words "First figure value indicated here."

At the opposite end of the check the safety zone B is divided into a vertical column of twenty spaces, in the first ten of which reading downward are printed the numerals 0 to 9 in reverse order. Just inside of this row of figures are printed the words "Second figure here." In the remaining ten spaces are printed the numerals 0 to 9 in regular order reading downward, and just inside this row of figures are printed the words "Third figure here."

It is of course understood that the precise arrangement of spaces and figures shown in the drawings is not absolutely necessary and that the designations may be somewhat varied.

I have shown in the drawings three concrete examples of the way in which the checks may be used and protected.

Fig. 2 illustrates the manner of preparing and protecting a check drawn for $647.82. The body of the check is filled out in the usual way for $647.82, as indicated. Complete protection against alteration is obtained by cutting away the figures 7, 8 and 9 in the safety zone A and the designations CM. M and M in the same column so that this column will read 600. This completely protects hundreds and multiples of hundreds. In order to protect the tens and units, i. e., the 47, the figures 5, 6, 7, 8 and 9 are cut away from the upper part of the column B and the numbers 8 and 9 from the lower part thereof, and the figures of this column will then read 47, i. e., four tens and seven units. The 82 cents need not be protected but may be risked.

In Fig. 3 I have indicated how the check should be prepared when the amount is for $5.00. In this case the safety zone B is entirely removed, leaving as shown the words "Second figure here"— "Third figure here." In the safety zone A the figures at the top of the column 6, 7, 8 and 9 are removed and at the bottom of the column the designations 10's, C. M. M CM. are removed, thus leaving the figure 5 at the top of the column of figures in the safety zone A and the designation U (units) in the lower part of the column. It is thus clearly shown that the check was drawn for no sum greater than units, and the figure 5 in the safety zone A shows that the units are 5 and nothing beyond 5, and the fact that the zone B has been entirely removed further indicates that the check was not drawn for any sum beyond units.

In Fig. 4 another concrete example is shown. In this case the check is drawn for $375,000.00. It is at once seen that the amount is over $100,000.00 and this is indicated in safety zone A by the fact that the first designation reading upward is C M.; in other words, $100,000.00 or over. At the top of the column of figures in the safety zone A the figures 4, 5, 6, 7, 8 and 9 have been removed, leaving the figure 3 as the highest remaining figure in the zone. This will indicate in connection with the designation C M. that the check is good for $300,000.00 and over. In the safety zone B the second figure of the amount is indicated by cutting away the numerals 8 and 9 at the top of the column, leaving the figure 7 as the first figure in the series, thus fixing the fact that the second figure of the amount is 7, i. e., 70,000 or over. The third figure of the amount is indicated at the bottom of the column in the safety zone B by cutting away the numerals 6, 7, 8 and 9, leaving the figure 5 to indicate the third figure of the amount i. e. 5,000. In this way the fact is established that the check was drawn for $375,000.00 or for an amount above this, up to $376,000.00. In such cases, that is, where the amount is large I do not attempt to protect any more than the first three figures of the amount. In like manner other amounts may be protected, the rule being that the highest dollar value of the first three figures should be indicated in safety zones at the ends of the check and the check should be void if the left-hand zone is detached. The first figure value should always be indicated in the left-hand zone, the second figure of the amount should be indicated in the upper part of the right-hand zone and the third figure should be indicated in the lower part of the right-hand zone.

My improved check, draft or other instrument, therefore, comprises a body portion of usual form with the usual blanks for the date, the names of the drawer and payee and blanks for the amount to be written in words and figures, and having at one end of its body portion a vertical column of figures from 1 to 9 arranged in reverse order from top downward and below these a vertical series of designations of units, tens and multiples thereof in decimal series arranged in reverse order from bottom upward and at the opposite end a similarly arranged column of spaces having printed therein numbers in arithmetical progression from 0 to 9 in reverse order and numbers from 0 to 9 in regular order.

It is thought to be unnecessary to give further concrete examples of the manner in which the check is used, the examples given and the rules for using the check shown on the body of the check and above described will sufficiently indicate how it should be used for any amount, and it will be thus seen that all necessary protection is provided for all amounts from 1 to 1,000,000.

I would recommend that in cutting away portions of the safety zones the cuts should be made in curved lines, as indicated, and it is obvious that such cuts may be made with scissors of usual form and that no special instruments are required.

I would call attention to the fact that a check made in accordance with my invention protects every dollar from one to one thousand; every ten dollars from one thousand to ten thousand; every hundred dollars from ten thousand to a hundred thousand, and every thousand dollars from one hundred thousand to a million.

I claim as my invention:—

1. A check having at one end of its body portion a vertical column of figures from 1 to 9 arranged in reverse order from the top reading downward, and below these a vertical series of designations of units, tens and multiples thereof in decimal series arranged in reverse order reading from the bottom upward, and at the opposite end a similarly arranged column of spaces having printed therein numbers in arithmetical progression from 0 to 9 in reverse order reading downward and numbers from 0 to 9 in regular order reading downward.

2. A check having blank upper and lower margins and having at one end of its body portion a vertical column of figures from 1 to 9 arranged in reverse order from the top reading downward, and below these a vertical series of designations of tens and multiples thereof in decimal series arranged in reverse order reading from the bottom upward, and at the opposite end a similarly arranged column of spaces having printed therein numbers in arithmetical progression from 1 to 9 in reverse order reading downward and numbers from 1 to 9 in regular order reading downward.

In testimony whereof, I have hereunto subscribed my name.

HENRY C. THATCHER.

Witnesses:
  LLOYD B. WIGHT,
  M. E. BURRELL.